US012570081B2

(12) United States Patent　　　　　(10) Patent No.:　US 12,570,081 B2
Choi et al.　　　　　　　　　　　　　　(45) Date of Patent:　　Mar. 10, 2026

(54) MEMBRANE DEVICE FOR MANUFACTURING CRASH PAD FOR VEHICLE INCLUDING REAL WOOD SHEET AND METHOD OF MANUFACTURING CRASH PAD FOR VEHICLE INCLUDING REAL WOOD SHEET USING MEMBRANE DEVICE

(71) Applicants: HYUNDAI MOBIS Co., Ltd., Seoul (KR); SEOYON AUTOVISION Co., Ltd., Dangjin-si (KR)

(72) Inventors: Ik Keun Choi, Yongin-si (KR); Min Kyeong Lee, Yongin-si (KR); Hyun Ho Lee, Gunpo-si (KR); Ji Seung Hong, Hwaseong-si (KR); Jong Jin Lee, Incheon (KR)

(73) Assignees: HYUNDAI MOBIS Co., Ltd., Seoul (KR); SEOYON AUTOVISION Co., Ltd., Dangjin-si (KR)

( * ) Notice: Subject to any disclaimer, the term of this patent is extended or adjusted under 35 U.S.C. 154(b) by 442 days.

(21) Appl. No.: 17/840,739

(22) Filed: Jun. 15, 2022

(65) Prior Publication Data

US 2023/0038216 A1　　Feb. 9, 2023

(30) Foreign Application Priority Data

Aug. 4, 2021　(KR) ......................... 10-2021-0102382

(51) Int. Cl.
　B32B 37/10　　　(2006.01)
　B29C 33/50　　　(2006.01)
　　　(Continued)

(52) U.S. Cl.
　CPC .......... B32B 37/1018 (2013.01); B32B 21/08 (2013.01); B32B 37/0046 (2013.01);
　　　(Continued)

(58) Field of Classification Search
　CPC　B30B 5/02; B29C 51/10; B29C 51/36; B29C 2791/006; B29C 33/50;
　　　(Continued)

(56) References Cited

U.S. PATENT DOCUMENTS 3,560,322 A * 2/1971 Magid ..................... B32B 27/00
　　　　　　　　　　　　　　　　　　　　　428/162
2005/0136756 A1* 6/2005 Kocher ..................... B32B 5/26
　　　　　　　　　　　　　　　　　　　　　442/41
　　　(Continued)

FOREIGN PATENT DOCUMENTS

DE　　203 09 721 U1　12/2003
EP　　0 586 360 A1　　3/1994
　　　(Continued)

*Primary Examiner* — Seyed Masoud Malekzadeh
(74) *Attorney, Agent, or Firm* — NSIP Law

(57)　　　　ABSTRACT

A membrane device for manufacturing a crash pad for a vehicle including a real wood sheet includes a vacuum device main body having a plurality of vacuum holes such that a real wood sheet to be temporarily attached to a core is mounted in the vacuum device main body, a cover having a silicone film to define a vacuum space together with the vacuum device main body, a vacuum module to suck air in the vacuum device main body through the vacuum holes, and a control unit to compress the real wood sheet and the core, which are temporarily attached and mounted on the vacuum device main body, for a preset time by sucking air in the vacuum space through the vacuum holes in a state in which the vacuum device main body is covered by the cover.

5 Claims, 8 Drawing Sheets

(51) Int. Cl.

| | |
|---|---|
| *B29C 51/10* | (2006.01) |
| *B29C 51/28* | (2006.01) |
| *B29C 51/36* | (2006.01) |
| *B29C 51/42* | (2006.01) |
| *B29C 51/44* | (2006.01) |
| *B32B 21/08* | (2006.01) |
| *B32B 37/00* | (2006.01) |
| *B32B 37/18* | (2006.01) |
| *B60R 21/04* | (2006.01) |

(52) U.S. Cl.

CPC ............ *B32B 37/182* (2013.01); *B60R 21/04* (2013.01); *B29C 33/50* (2013.01); *B29C 51/10* (2013.01); *B29C 51/28* (2013.01); *B29C 51/36* (2013.01); *B29C 51/42* (2013.01); *B29C 51/44* (2013.01); *B29C 2791/006* (2013.01); *B32B 2605/00* (2013.01)

(58) Field of Classification Search

CPC .......... B29C 2791/002; B29C 33/3857; B29C 51/34; B29C 33/485; B29C 33/405; B29C 51/30; B29C 51/44; B29C 51/46; B29C 51/00; B29C 51/28; B29C 51/42; B32B 37/1018; B32B 37/10; B32B 37/0046; B32B 2605/003; B32B 21/08; B29L 2031/3005; B29L 2031/3055

See application file for complete search history.

(56) References Cited

U.S. PATENT DOCUMENTS

| | | | |
|---|---|---|---|
| 2013/0243983 A1 | 9/2013 | Omote et al. | |
| 2014/0009733 A1* | 1/2014 | Francavilla ............ | B29D 12/02 |
| | | | 264/161 |
| 2015/0321452 A1* | 11/2015 | Egashira ................. | B29C 48/15 |
| | | | 428/354 |
| 2017/0152616 A1* | 6/2017 | Brown ..................... | D04H 3/02 |
| 2017/0341278 A1* | 11/2017 | Shair ...................... | B29C 43/20 |
| 2021/0086434 A1* | 3/2021 | James .................... | A43B 13/20 |
| 2021/0115681 A1* | 4/2021 | Saladino .............. | B32B 27/065 |
| 2022/0032572 A1* | 2/2022 | Sollie .................... | B32B 37/226 |

FOREIGN PATENT DOCUMENTS

| | | | |
|---|---|---|---|
| EP | 1 491 311 | A1 | 12/2004 |
| GB | 1158423 | A | 7/1969 |
| KR | 20200042116 | A | 4/2020 |

\* cited by examiner

VACUUM PUMP

MEMBRANE DEVICE FOR MANUFACTURING CRASH PAD FOR VEHICLE INCLUDING REAL WOOD SHEET AND METHOD OF MANUFACTURING CRASH PAD FOR VEHICLE INCLUDING REAL WOOD SHEET USING MEMBRANE DEVICE

CROSS-REFERENCE TO RELATED APPLICATIONS

This application claims the benefit under 35 USC § 119(a) of Korean Patent Application No. 10-2021-0102382, filed on Aug. 4, 2021 in the Korean Intellectual Property Office, the entire disclosure of which is incorporated herein by reference for all purposes.

BACKGROUND

1. Technical Field

The present disclosure relates to real wood skin used for automatic wrapping, and a process and apparatus for manufacturing the same.

2. Related Art

Real wood skin applied to a vehicle in the related art is made by preforming a real wood sheet on deco-veneer wood and then performing insert-injection molding (back injection).

Thereafter, trimming is performed on an end of the injection-molded real wood sheet, and then curling and coating are sequentially performed on the real wood sheet, thereby manufacturing the real wood skin.

The real wood skin product in the related art, which is made by applying the back insert-injection molding process, may provide real wood having a visually and tactilely excellent surface. However, because the real wood having high hardness is attached to the injection-molded part, the real wood provides cheeping feeling to a customer when the customer pushes the real wood.

Of course, some customers may think that it is natural for the real wood to have high hardness. However, a customer, who needs soft interior materials, cannot be satisfied with the real wood.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to solve the problems in the related art, and an object of the present disclosure is to provide a membrane device for manufacturing a crash pad for a vehicle including a real wood sheet, which is capable of visually providing a real wood feeling, and providing flexibility.

Another object of the present disclosure is to provide a membrane device for manufacturing a crash pad for a vehicle including a real wood sheet, which is capable of simultaneously performing real wood forming and core attachment using a membrane method without performing a preforming process on wood.

The objects of the present disclosure are not limited to the aforementioned objects, and other objects, which are not mentioned above, may be clearly understood from the following descriptions.

In one general aspect, a membrane device for manufacturing a crash pad for a vehicle including a real wood sheet includes: a vacuum device main body having a plurality of vacuum holes and configured such that the real wood sheet to be temporarily attached to a core is mounted in the vacuum device main body; a cover having a silicone film and configured to define a vacuum space together with the vacuum device main body; a vacuum module configured to suck air in the vacuum device main body through the vacuum holes; and a control unit configured to compress the real wood sheet and the core, which are temporarily attached and mounted on the vacuum device main body, for a preset time by sucking air in the vacuum space through the vacuum holes in a state in which the vacuum device main body is covered by the cover, the control unit being configured to remove the vacuum from the vacuum space by controlling the vacuum module so that the compressed real wood sheet is detached from the vacuum device main body.

The membrane device may include a heater configured to heat an interior of the vacuum space, and the control unit may be configured to heat the real wood sheet for a preset time before compressing the core and the real wood sheet by operating the vacuum module.

The vacuum device main body may have a plurality of wood seating pins that is movable upward or downward to seat the real wood sheet.

The vacuum device main body may have a fixing jig on which the core is mounted, the core may be seated on the fixing jig, and the real wood sheet may be seated on the wood seating pins.

The membrane device may include a vibration module configured to correct a position of the real wood sheet by applying vibration to the core disposed below the real wood sheet.

In another general aspect, a method of manufacturing a crash pad for a vehicle including a real wood sheet using a membrane device includes: moving a plurality of wood seating pins upward in a vacuum device main body in a state in which a cover is opened from the vacuum device main body; positioning a core on a fixing jig disposed inside the wood seating pin, mounting a real wood sheet on upper portions of the wood seating pins, and closing and covering the vacuum device main body with the cover; compressing, by a control unit, a silicone film disposed on the cover against the real wood sheet while implementing a vacuum state in the vacuum device main body through vacuum holes disposed in a lower portion of the vacuum device main body by operating a vacuum module; and removing the vacuum from an interior of the vacuum device main body, opening the cover, and detaching a completely produced real wood product from the vacuum device main body.

The compressing of the silicone film against the real wood sheet may include heating the interior of the vacuum device main body for a preset time.

The compressing of the silicone film against the real wood sheet may include maintaining the vacuum state for a preset time and completing the compressing process.

The closing of the vacuum device main body may include correcting a position of the real wood sheet by applying vibration to the vacuum device main body and the core disposed below the real wood sheet using a vibration module.

According to the first embodiment of the present disclosure, the real wood sheet constituting the desk of the vehicle may visually provide the same feeling as real wood and provide a predetermined degree of cushioning when the occupant touches the real wood sheet.

According to the second embodiment of the present disclosure, the semi-automatic/full-automatic process is developed by improving the membrane and the compressing process, thereby solving the problem of the injection molding process of manufacturing the real wood insert in the related art, improving quality, and reducing costs by shortening the product manufacturing time.

According to the second embodiment of the present disclosure, as illustrated in FIG. 9, it is possible to very precisely treat the 3D data value (R) of the edge of the core when the real wood sheet is compressed against the edge of the core.

Other features and aspects will be apparent from the following detailed description, the drawings, and the claims.

BRIEF DESCRIPTION OF THE DRAWINGS

FIG. 1 is a reference view for explaining real wood skin according to the present disclosure which may be used for automatic wrapping.

FIG. 3 is a view for explaining a membrane device for manufacturing a crash pad for a vehicle including a real wood sheet according to a second embodiment of the present disclosure.

FIG. 4 is a configuration block diagram for explaining the membrane device for manufacturing a crash pad for a vehicle including a real wood sheet according to the second embodiment of the present disclosure.

FIGS. 5, 6, 7, and 8 are reference views for explaining a process of operating the membrane device for manufacturing a crash pad for a vehicle including a real wood sheet according to the second embodiment of the present disclosure.

FIG. 9 is a reference view for explaining a result of compressing a core and a real wood sheet produced as illustrated in FIG. 3.

DETAILED DESCRIPTION

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure. Unless particularly stated otherwise in the present specification, a singular form also includes a plural form.

The terms "comprise (include)" and/or "comprising (including)" used in the specification are intended to specify the presence of the mentioned constituent elements, steps, operations, and/or elements, but do not exclude the presence or addition of one or more other constituent elements, steps, operations, and/or elements.

Figure 1:
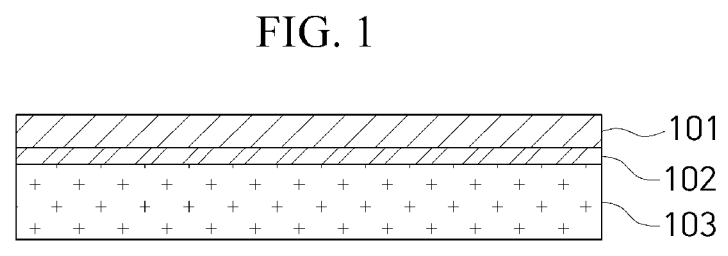

FIG. 1 is a reference view for explaining real wood skin according to the present disclosure which may be used for automatic wrapping.

As illustrated in FIG. 1, real wood skin according to a first embodiment of the present disclosure, which may be used for automatic wrapping, includes a wood layer 101, a mesh layer 102, and a flexible layer 103.

The wood layer 101 is a layer that provides the same visual feeling as a wooden material. The wood layer 101 may have a thickness of 0.1 t to 0.2 t and may have a grain of wood made by a shading machine.

Further, the mesh layer 102 is a layer stacked on a lower portion of the wood layer 101 and configured to reinforce a sheet. The mesh layer 102 may have a thickness of 0.2 t.

In addition, the flexible layer 103 is a layer stacked on a lower portion of the mesh layer 102 and configured to provide flexibility. The flexible layer 103 may be made of one of polypropylene (PP) foam and thermoplastic polyolefin (TPO) foam. Further, the flexible layer 103 may have a thickness of 1 t to 2 t.

In addition, according to the first embodiment of the present disclosure, the real wood skin may further include a protective film 104 stacked on an upper portion of the wood layer 101 and configured to protect the wood layer. The protective film 104 may have a thickness of 0.1 t.

FIGS. 2A to 2E are reference views for explaining a process of manufacturing a real wood sheet according to the first embodiment of the present disclosure.

Figure 2A:
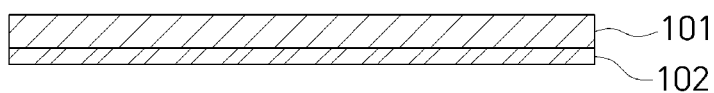
FIGS. 2A, 2B, 2C, 2D, and 2E are reference views for explaining a process of manufacturing a crash pad for a vehicle including a real wood sheet according to a first embodiment of the present disclosure.
Figure 2B:
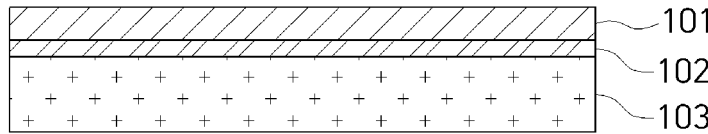
Figure 2C:
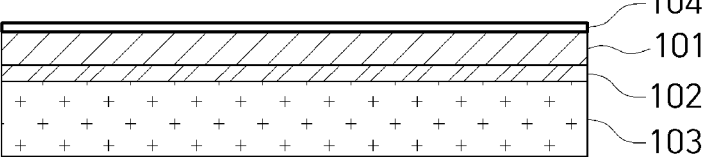

As illustrated in FIG. 2A, in the real wood sheet according to the first embodiment of the present disclosure, the mesh layer 102 is stacked on a lower end of the wood layer 101. Thereafter, as illustrated in FIG. 2B, the flexible layer 103 is stacked on a lower end of the mesh layer 102. Further, as illustrated in FIG. 2C, the protective film 104 may be stacked on an upper end of the wood layer 101 and protect the wood layer 101.

Figure 2D:
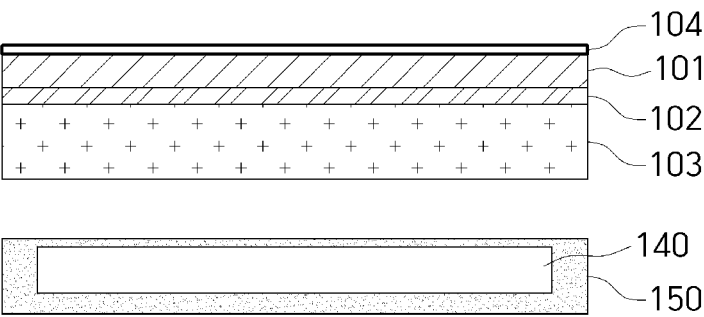
Figure 2E:
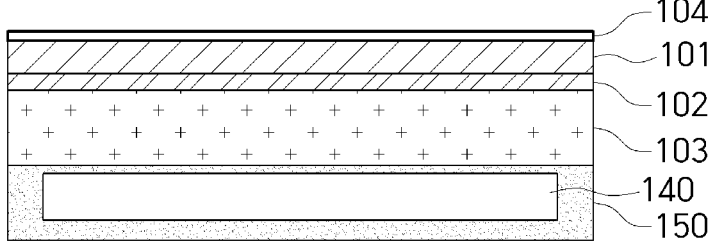

As illustrated in FIG. 2D, a real wood sheet 100 including the wood layer 101, the mesh layer 102, and the flexible layer 103 further includes a filament cross pad 140 and a core 150 disposed at a lower side thereof.

The filament cross pad 140 is provided in a partial region of a desk in order to provide cushioning to the partial region of the region of the desk of the vehicle.

Meanwhile, the filament cross pad 140 provided in one region of the desk may be stacked on a lower portion of the flexible layer 103. In this case, the filament cross pad 140 may have a thickness of 2 t to 5 t. In this case, a region to which the filament cross pad 140 is applied is an entire region that the hand may reach, i.e., a region within 3 mm or less from an end of an injection-molded portion of the real wood sheet. The filament cross pad 140 may be a pad made of a material such as PP or TPO. However, the material of the filament cross pad 140 is not limited thereto.

Further, the core 150 may be mounted on the desk of the vehicle and have a thickness of 0.3 t.

Meanwhile, a bonding process of applying a bonding agent onto the core 150 is performed after a process of applying primer to the core 150, and then the filament cross pad 140 is attached to the core 150. In this case, the filament cross pad 140 may be attached by using a membrane or by pressing.

Next, a bonding process of applying a bonding agent onto an upper portion of the filament cross pad 140 is performed, and then the wood layer 101, the mesh layer 102, the flexible layer 103, the filament cross pad 140, and the protective film are compressed by a compression jig.

As described above, the real wood sheet 100 constituting the desk of the vehicle may provide the same visual feeling as real wood and provide a predetermined degree of cushioning when an occupant touches the real wood sheet 100.

According to the first embodiment of the present disclosure, the PP foam/TPO foam may be applied onto a wood rear surface to increase an elongation percentage of the real wood sheet and improve quality of a surface of the real wood sheet, and the filament cross pad, which is used for natural leather or artificial leather in the related art, may be applied to the core, thereby providing a real-wood-wrapped product with softness that cannot be implemented when the real wood sheet in the related art is manufactured by injection-molding.

Figures 3, 4:
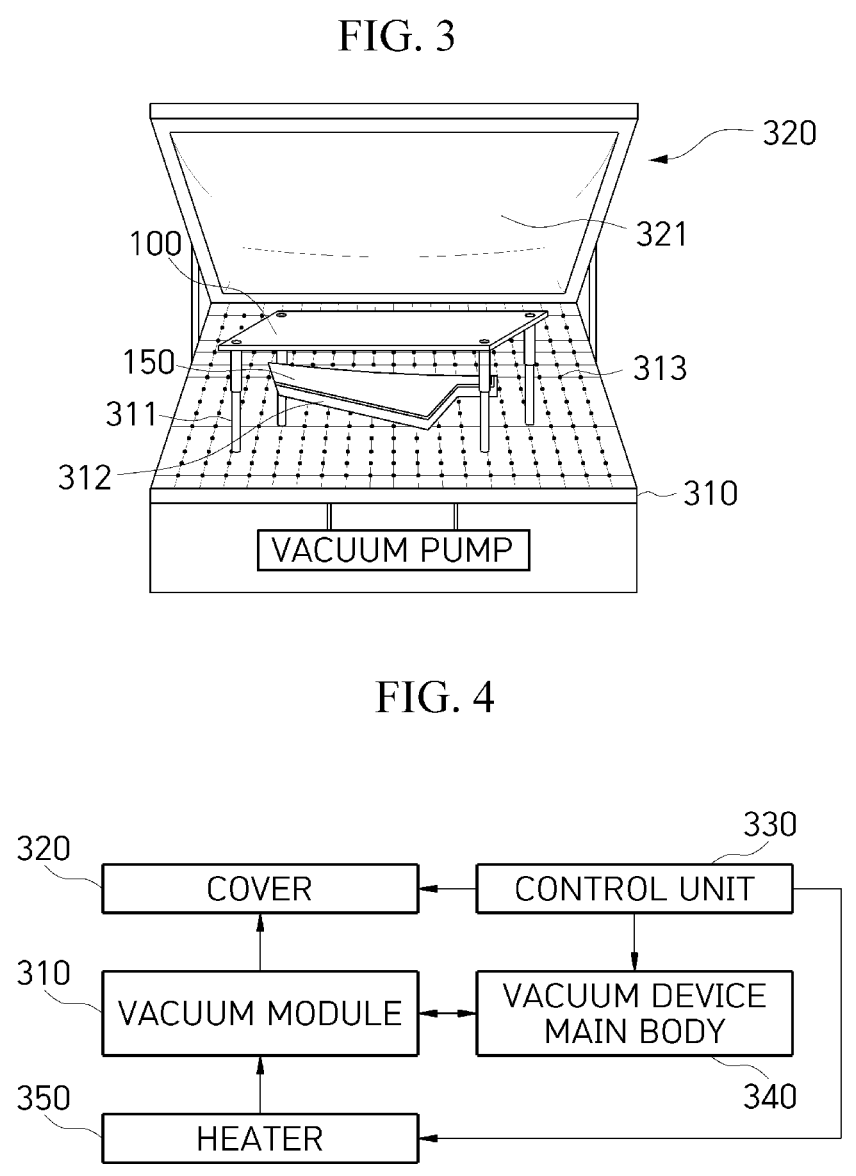

FIG. 3 is a view for explaining a membrane device for manufacturing a crash pad for a vehicle including a real wood sheet according to a second embodiment of the present disclosure, and FIG. 4 is a configuration block diagram for explaining the membrane device for manufacturing a crash pad for a vehicle including a real wood sheet according to the second embodiment of the present disclosure.

As illustrated in FIGS. 3 and 4, the membrane device for manufacturing a crash pad for a vehicle including a real wood sheet according to the second embodiment of the present disclosure includes a vacuum device main body 310, a cover 320, a vacuum module 330, and a control unit 340.

The vacuum device main body 310 has vacuum holes 313, and the real wood sheet 100 temporarily attached to the core 150 is mounted on the vacuum device main body 310. Further, the vacuum device main body 310 is closed by the cover 320 and then kept in a vacuum state through the vacuum holes 313.

The cover 320 has a silicone film 321 and defines a vacuum space together with the vacuum device main body 310. The cover 320 may have a structure capable of providing a space for accommodating the real wood sheet 100, wood seating pins, the core, and a fixing jig 312 in the vacuum device main body 310 when the vacuum device main body 310 is closed.

The vacuum module 330 implements the vacuum state by sucking air in the vacuum device main body 310 through the vacuum holes 313 provided in a lower portion of the vacuum device main body 310.

In the state in which the vacuum device main body 310 is covered by the cover 320, the control unit 340 compresses, for a preset time, the core 150 and the real wood sheet 100, which are temporarily attached and mounted on the vacuum device main body 310, by sucking air in the vacuum space through the vacuum holes 313 of the vacuum device main body 310. Thereafter, the control unit 340 removes the vacuum from the vacuum space by controlling the vacuum module so that the compressed real wood sheet 100 may be detached.

In addition, the membrane device according to the second embodiment of the present disclosure further includes a heater 350 configured to heat the interior of the vacuum space.

Meanwhile, the control unit 330 further includes a vibration module (not illustrated) and controls the vacuum module 340 in order to vibrate the real wood sheet 100 for a preset time before the core 150 and the real wood sheet 100 are compressed, such that the real wood sheet 100 may be seated at an exact position on the core 150.

Meanwhile, a plurality of wood seating pins 311 is provided on the vacuum device main body 310 so as to be movable upward or downward and serves to seat the real wood sheet 100.

Further, the vacuum device main body 310 has the fixing jig 312 on which the core 150 is mounted. The core 150 is seated on the fixing jig 312, and the real wood sheet 100 is seated on the wood seating pins 311.

In the second embodiment of the present disclosure, the membrane device further includes a vibration module 360 configured to correct the position of the real wood sheet 100 by applying vibration to the vacuum device main body 310 and the core 150 below the real wood sheet 100.

In addition, in the second embodiment of the present disclosure, the heater is disposed above the silicone film 321. A temperature of the heater may be 90 C.

Hereinafter, a method of manufacturing a crash pad for a vehicle including a real wood sheet using the membrane device according to the second embodiment of the present disclosure will be described with reference to FIGS. 5 to 10.

Figure 5:
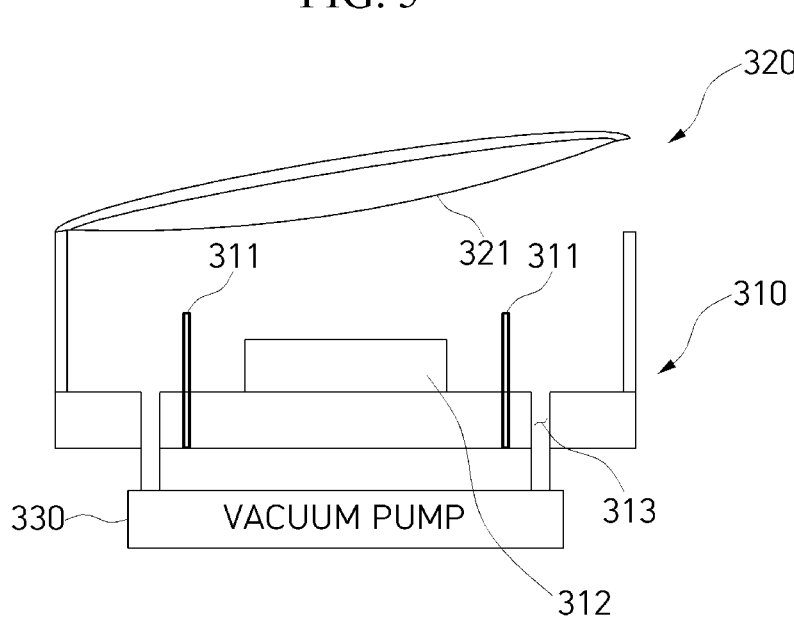

First, as illustrated in FIG. 5, in a state in which the cover 320 is opened from the vacuum device main body 310, the plurality of wood seating pins 311 moves upward in the vacuum device main body 310 (S110). In this case, the fixing jig 312 may be provided inside the plurality of wood seating pins 311 moved upward in the vacuum device main body 310.

Figure 6:
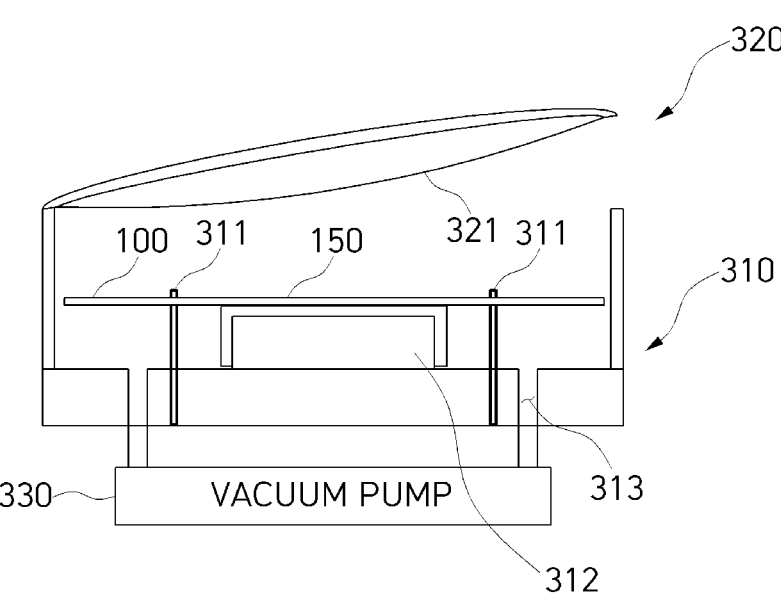
Figures 7, 8:
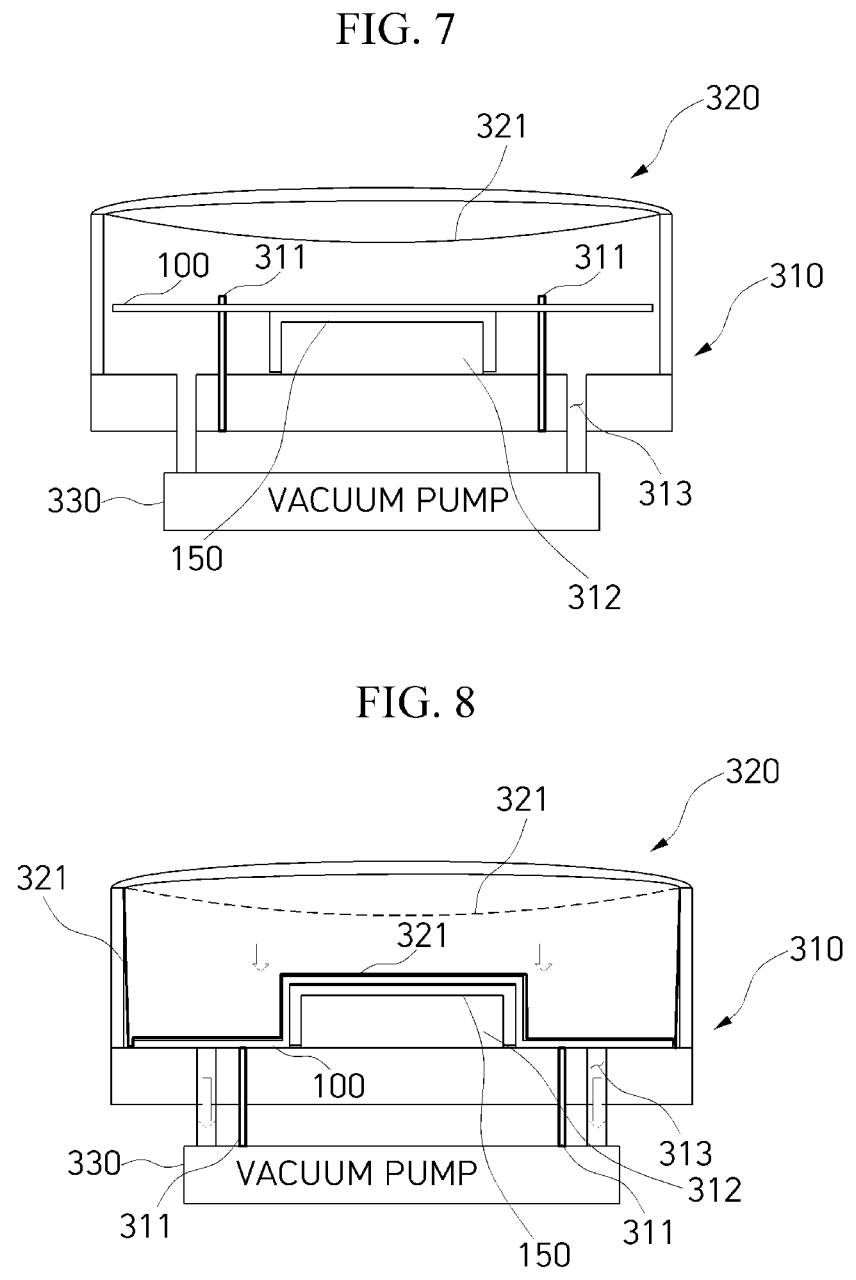
Figure 10:
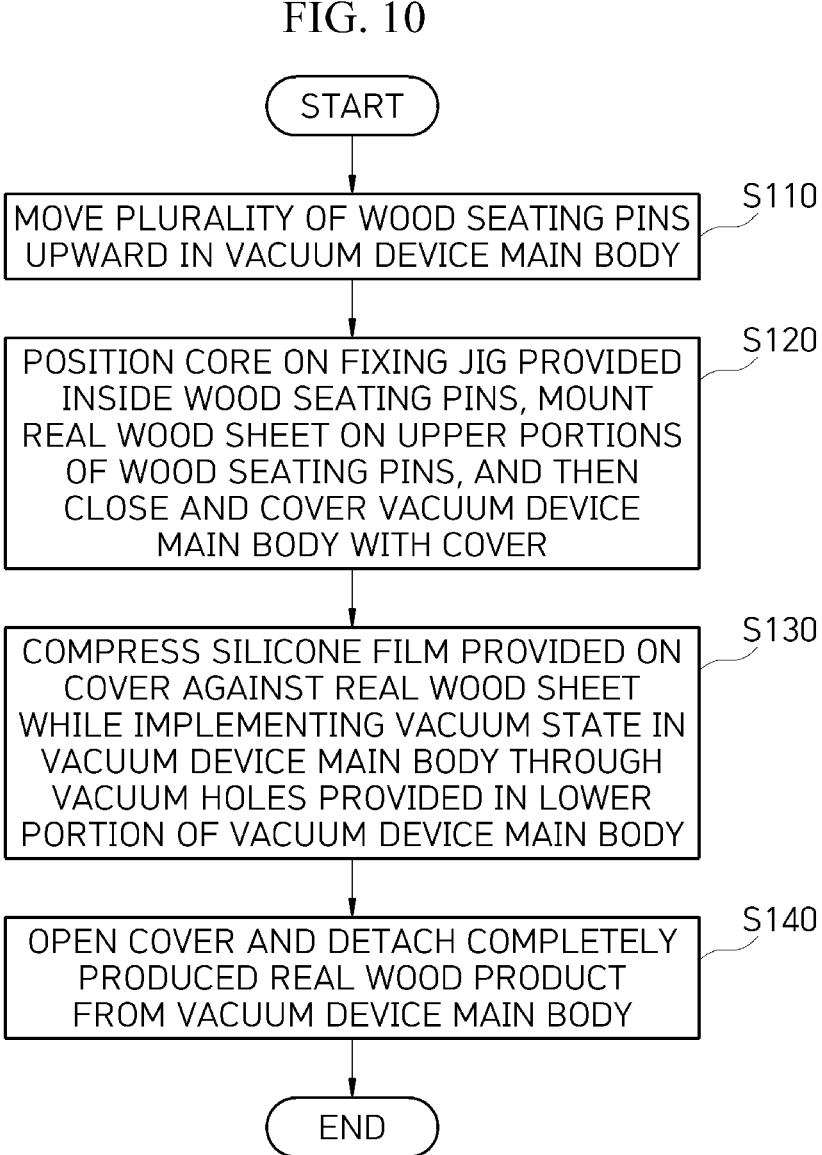
FIG. 10 is a flowchart illustrating a method of manufacturing a crash pad for a vehicle including a real wood sheet using the membrane device according to the second embodiment of the present disclosure.

Thereafter, as illustrated in FIG. 6, the core 150 is disposed inside the wood seating pins 311 and positioned on the fixing jig 312, and the real wood sheet 100 is mounted on the upper portions of the wood seating pins 311. Thereafter, as illustrated in FIG. 7, the vacuum device main body 310 is covered and closed by the cover 320 (S120). Meanwhile, in step S120 of closing of the vacuum device main body 310, the vibration module may apply vibration to the vacuum device main body and the core below the real wood sheet, thereby correcting the position of the real wood sheet.

Thereafter, as illustrated in FIG. 8, the control unit 330 implements a vacuum state in the vacuum device main body 310 through the vacuum holes 313 provided in the lower portion of the vacuum device main body 310 by operating the vacuum module 340, thereby compressing the silicone film provided on the cover 320 against the real wood sheet 100 (S130). Therefore, the real wood sheet 100 is seated on the surface of the core 150 as the wood seating pins 311 move downward.

In step S130 of compressing the silicone film against the real wood sheet according to the present disclosure, the interior of the vacuum device main body 310 may be heated for a preset time (50 seconds). The compressing process is completed by maintaining the vacuum state for a preset time (55 seconds). With this process, the real wood sheet 100 and the core 150 may be very tightly compressed, which makes it possible to minimize a 3D data value (R) of an edge of the core 150.

When the compressing process is completed as described above, the vacuum is removed from the interior of the vacuum device main body 310, the cover 320 is opened, and then the completely produced real wood product is detached from the vacuum device main body 310 (S140).

According to the embodiment of the present disclosure, it is possible to solve the problem of the injection molding process of manufacturing the real wood insert in the related art, improve quality, and reduce costs by shortening the product manufacturing time.

According to the embodiment of the present disclosure, the semi-automatic/full-automatic process may be developed by improving the membrane and the compressing process, thereby solving the problem of the injection molding process of manufacturing the real wood insert in the related art, improving quality, and reducing costs by shortening the product manufacturing time.

Figure 9:
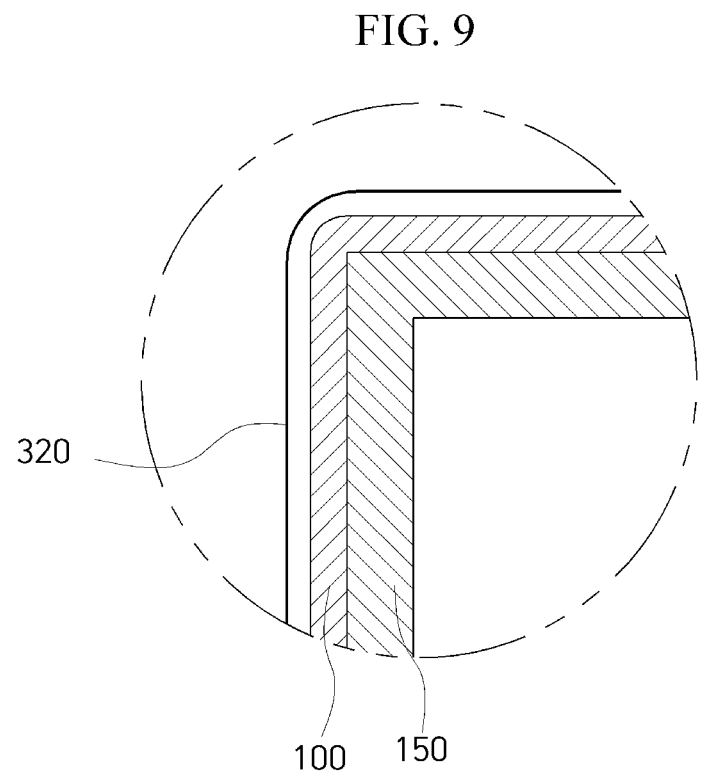

According to the embodiment of the present disclosure, as illustrated in FIG. 9, it is possible to very precisely treat the 3D data value (R) of the edge of the core when the real wood sheet is compressed against the edge of the core.

In addition, the second embodiment of the present disclosure is also advantageous in that an anti-deformation jig is not needed.

A membrane device for manufacturing a crash pad for a vehicle including a real wood sheet according to a third embodiment of the present disclosure includes the vacuum device main body 310, the cover 320, the vacuum module 330, and the control unit 340.

The vacuum device main body 310 has the vacuum holes 313, and the real wood sheet 100 temporarily attached to the core 150 is mounted on the vacuum device main body 310. Further, the vacuum device main body 310 is closed by the cover 320 and then kept in a vacuum state through the vacuum holes 313.

Further, the plurality of wood seating pins 311 is provided on the vacuum device main body 310 so as to be movable upward or downward and serves to seat the real wood sheet 100. The vacuum device main body 310 has the fixing jig 312 on which the core 150 is mounted. The core 150 is seated on the fixing jig 312, and the real wood sheet 100 is fixed to the wood seating pins 311.

Further, the vacuum device main body 310 includes an introduction space 314 provided at a lower side of the fixing jig 312, and the remaining part of the real wood sheet, which is not compressed against the core 150 during a primary vacuum process, may be introduced into the introduction space 314 in order to implement automatic wrapping using the real wood sheet.

The fixing jig 312 according to the present embodiment further includes sliders 315 positioned at two opposite sides of the fixing jig 312 and configured to define a jig for supporting the core 150 during the primary vacuum compressing process. The sliders 315 move downward during the wrapping process using the real wood sheet, and the sliders 315 move upward when the real wood sheet is introduced into the introduction space 314, thereby performing a process of wrapping the real wood sheet 100 around the inside of the core 150.

The cover 320 has the silicone film 321 and defines a vacuum space together with the vacuum device main body 310. The cover 320 may have a structure capable of providing a space for accommodating the real wood sheet 100, the wood seating pins, the core, and the fixing jig 312 in the vacuum device main body 310 when the vacuum device main body 310 is closed.

The vacuum module 330 implements the vacuum state by sucking air in the vacuum device main body 310 through the vacuum holes 313 provided in the lower portion of the vacuum device main body 310.

In the state in which the vacuum device main body 310 is covered by the cover 320, the control unit 340 compresses, for a preset time, the core 150 and the real wood sheet 100, which are temporarily attached and mounted on the vacuum device main body 310, by sucking air in the vacuum space through the vacuum holes 313 of the vacuum device main body 310. Thereafter, the control unit 340 removes the vacuum from the vacuum space by controlling the vacuum module so that the compressed real wood sheet 100 may be detached.

Thereafter, a crash pad for a vehicle including the real wood sheet 100 may be manufactured by cutting the remaining portion except for the real wood sheet 100 compressed against the core 150.

According to the embodiment of the present disclosure, the real wood sheet constituting the desk of the vehicle may provide the same visual feeling as real wood and provide a predetermined degree of cushioning when the occupant touches the real wood sheet.

In addition, according to the embodiment of the present disclosure, the edge portion of the crash pad for a vehicle including the real wood sheet is manufactured by using the membrane method, which makes it possible to more precisely attach the real wood sheet to the core.

While the configuration of the present disclosure has been described above in detail with reference to the accompanying drawings, the description of the configuration is for illustrative purposes only, and various modifications and alterations may of course be made by those skilled in the art without departing from the technical spirit of the present disclosure. Accordingly, the protection scope of the present disclosure should not be limited by the above-mentioned embodiments but should be determined by the appended claims.

What is claimed is:

1. A membrane device for manufacturing a crash pad for a vehicle including a real wood sheet, the membrane device comprising:

a vacuum device main body having a plurality of vacuum holes and configured such that the real wood sheet to be temporarily attached to a core is mounted in the vacuum device main body, the vacuum device main body comprising a plurality of wood seating pins that are movable upward or downward to seat the real wood sheet;

a cover configured to be in an open state, in which the cover is open to expose the vacuum device main body, and a closed state, in which the cover is closed on the vacuum device main body, to define a vacuum space together with the vacuum device main body in the closed state, the cover including a silicone film disposed along an inside surface thereof;

a vacuum module configured to suck air in the vacuum device main body through the vacuum holes; and a control unit configured to compress the real wood sheet and the core with the silicone film, which are temporarily attached and mounted on the vacuum device main body, for a preset time by sucking air in the vacuum space through the vacuum holes in a state in which the vacuum device main body is covered by the cover in the closed state, the control unit being configured to remove the vacuum from the vacuum space by controlling the vacuum module so that the compressed real wood sheet is detached from the vacuum device main body.

2. The membrane device of claim 1, further comprising:

a heater disposed above the silicone film in the closed state and configured to heat an interior of the vacuum space, wherein the control unit is configured to heat the real wood sheet for a preset heating time before compressing the core and the real wood sheet by operating the vacuum module.

3. The membrane device of claim 1, wherein the vacuum device main body comprises a fixing jig on which the core is mounted, the core is seated on the fixing jig, and the real wood sheet is seated on the wood seating pins.

4. The membrane device of claim 1, further comprising:
a vibration module configured to correct a position of the real wood sheet by applying vibration to the core disposed below the real wood sheet.

5. A crash pad for a vehicle, the crash pad comprising a real wood sheet manufactured by a membrane device for a vehicle according to claim 1.

* * * * *